United States Patent [19]

Hombach et al.

[11] Patent Number: 4,595,445

[45] Date of Patent: Jun. 17, 1986

[54] ADHESIVE JOINING OF SURFACES USING THERMOSETTING POLYURETHANE UREA REACTIVE ADHESIVE COMPOSITIONS

[75] Inventors: Rudolf Hombach, Leverkusen; Manfred Dollhausen, Odenthal; Heinrich Hess; Gerhard Grögler, both of Leverkusen; Richard Kopp, Cologne; Artur Reischl, Leverkusen, all of Fed. Rep. of Germany

[73] Assignee: Bayer Aktiengesellschaft, Leverkusen, Fed. Rep. of Germany

[21] Appl. No.: 694,561

[22] Filed: Jan. 24, 1985

[30] Foreign Application Priority Data

Feb. 2, 1984 [DE] Fed. Rep. of Germany ....... 3403499

[51] Int. Cl.$^4$ ................................................. C09J 5/02
[52] U.S. Cl. ............................ 156/307.3; 156/308.2; 156/331.4; 427/207.1; 427/208.2; 427/208.4; 528/44; 528/64; 528/73; 528/76; 528/902
[58] Field of Search ............... 156/307.3, 308.2, 331.4; 427/207.1, 208.2, 208.4; 528/44, 73, 64, 76, 902

[56] References Cited

U.S. PATENT DOCUMENTS

| | | | |
|---|---|---|---|
| 3,475,200 | 10/1969 | Kallert et al. | 138/137 |
| 4,076,774 | 2/1978 | Short | 264/4 |
| 4,330,454 | 5/1982 | Kimball | 524/773 |
| 4,400,978 | 8/1983 | Bos | 524/38 |
| 4,483,974 | 11/1984 | Grögler et al. | 528/68 |
| 4,496,706 | 1/1985 | Chang | 528/57 |
| 4,515,933 | 5/1985 | Chang | 528/57 |
| 4,525,570 | 6/1985 | Blum | 528/75 |

FOREIGN PATENT DOCUMENTS

1103202 2/1968 United Kingdom .

*Primary Examiner*—Maurice J. Welsh
*Attorney, Agent, or Firm*—Gene Harsh; Joseph C. Gil

[57] ABSTRACT

The present invention relates to the use of thermosetting polyurethane urea reactive adhesive compositions which are stable at ambient temperature but rapidly set at higher temperatures, wherein the adhesive comprises stabilized finely-divided polyisocyanates of retarded reactivity of which 0.1 to 25% of the NCO-groups are surface-modified and higher and/or lower molecular polyamines (optionally with polyols as additional reactive components). An important feature of these thermosetting reactive adhesive compositions is their capacity for storage at ambient temperature and their spontaneous increase in viscosity at relatively low heating temperatures which prevents the adhesive from running off during the heating period when applied to vertical surfaces.

20 Claims, No Drawings

ADHESIVE JOINING OF SURFACES USING THERMOSETTING POLYURETHANE UREA REACTIVE ADHESIVE COMPOSITIONS

BACKGROUND OF THE INVENTION

The use of polyisocyanates in a mixture with polyamines or polyols as adhesives is known. Since the polyisocyanates react with the polyamines or polyols at ambient temperature, such adhesive mixtures are not stable in storage at ambient temperature. Therefore they must be prepared and processed within the limited pot life by mixing the separately stored reaction components just before they are to be used.

To prepare adhesive compositions which are stable in storage at ambient temperature, blocked polyisocyanates have also been used in which the isocyanate groups are completely reacted with monofunctional compounds such as phenol, caprolactam, malonic esters or similar compounds. These blocked polyisocyanates separate the blocking agent in a reversible manner at elevated temperature and liberate the polyisocyanate for the subsequent, generally irreversible polyaddition reaction to form the adhesive (c.f. Vieweg/Höchtlen, Kunststoff-Handbuch, Volume 7, Polyurethanes, Carl-Hanser-Verlag, Munich 1966). This process has the disadvantage that the blocking agent remains in the adhesive film in relatively large quantities. Moreover, the deblocking temperature of storage-stable blocked polyisocyanates is generally very high. Furthermore, before the reaction temperature of adhesive systems blocked in this way was attained, the adhesive ran off vertical surfaces due to the reduction in viscosity thus produced in the adhesive. Moreover, deformation and damage can easily occur in plastic due to the heating necessary.

Storage-stable adhesives can also be prepared polyurethane prepolymers containing only a small amount of free isocyanate with a complex of alkali salt and 4,4,'-diaminodiphenylmethane. Upon heating, the diamine bound in the complex is liberated and reacts with the NCO-prepolymer (see European Pat. No. 62,598). A disadvantage of this formulation is in the high alkali salt content which remains in the adhesive after the adhesive sets. This considerably reduces the water resistance of the composition.

German Auslegeschrift No. 1,570,548 describes a one component system which can be stored for a prolonged period and which consists of a mixture of (i) 1 mol of polyester, polyether or polythioether, (ii) at least 1.5 mol of a solid isocyanate containing uretdione groups with a melting point of 100° C. or more and (iii) at least 0.3 mol of a solid chain extender containing OH and/or $NH_2$ groups with a melting point of 80° C. or more. At least 80% of the solid constituents of the mixture must have particle sizes of 30 μm or less. The stability in storage lasts for a few days to a few weeks at ambient temperature and only a few hours at 50° C. A disadvantage of the process is that of three reactants, at least two must be present in solid form to ensure the necessary stability in storage. This means that very high-viscosity mixtures are generally obtained. Additionally, the viscosity continues to rise slowly because the reactivity of the compounds has not been slowed down. The reaction apparent from the continuous increase in viscosity on the surface of the solid isocyanate particles takes place randomly and slowly and does not therefore retard the reactivity of the polyisocyanates sufficiently for a self-stabilization of the system.

German Auslegeschrift No. 3,112,054 (corresponding to U.S. Pat. No. 4,400,497) describes thermosetting mixtures of polyisocyanate and polyol which are stable in storage at ambient temperature. In these mixtures, the polyisocyanate is present in the form of discrete particles in the polyol, the polyisocyanate particles being deactivated on their surface to 0.5 to 20 equivalent % of the total isocyanate groups present by partial reaction with water, polyols or polyamines. These mixtures are suitable as coating and adhesive agents and as sealants, and in particular as undercoating material for automotive vehicles. When using these mixtures as adhesives, several disadvantages arise. Thus, the setting rate of the glycol-containing systems is too slow for practical purposes even in the presence of catalysts. Additionally, exclusively glycol or hydroxy polyether-containing systems tend to foam markedly during curing in heat even after previous careful dewatering. Another disadvantage of single component polyurethane adhesive compositions, even those based on stabilized polyisocyanates containing exclusively polyether polyols and optionally polyol chain extenders as components reactive towards isocyanates, lies in their restricted storage capacity particularly at elevated storage temperature.

Unstabilized single component mixtures of polyol, glycol, solid polyisocyanate (for example dimeric tolylene diisocyanate) and catalyst can be stored for a few hours or days at ambient temperature depending on the composition. The stability in storage of single component polyurethane reactive compositions based on polyether polyols and glycol chain extenders is improved considerably by stabilization of the solid isocyanate by applying a thin polyurea protective covering on the surface of the solid polyisocyanate particles with reaction of about 0.5 to 20% of the NCO groups with, for example, polyamines according to DE-A No. 3,112,054, but their stability in storage is still limited. The possible storage period is therefore a few days at about 40° C. and only a few hours or days at 50° C.

DESCRIPTION OF THE INVENTION

The reactive adhesive compositions according to the present invention exhibit very good stability in storage even at elevated temperatures, for example, for about 6 months and more at 50° C. One component reactive adhesive compositions containing exclusively aliphatic and/or aromatic amino polyethers and/or aromatic polyamine chain extenders are stable in storage for almost as long as desired (more than one year) even at temperatures of up to 70° C. Any restriction in their storage life is caused in many cases only by the thermooxidative decomposition reactions which may slowly take place, and not by a polyaddition reaction of the polyisocyanate with polyamines. It is surprising that amines, in spite of their higher reactivity towards isocyanate groups when compared to polyols, cause such an improvement in the stability in storage.

The invention therefore relates to a process for adhesively joining two surfaces wherein an adhesive is first applied to at least one of the surfaces and the surfaces are then brought into contact with each other, the improvement wherein the adhesive is a thermosetting reactive adhesive (i) which sets rapidly at a temperature of 80° C. or more, (ii) which is stable in storage at ambient temperature, (iii) which is flowable or melts easily at ambient or slightly higher temperatures, (iv) which comprises (A) surface-modified, finely-divided polyisocyanates, wherein from 0.1 to 25 equivalent % of the NCO groups of the unmodified polyisocyanate have been deactivated, preferably by reaction with aliphatic polyamines, hydrazines, alkyl hydrazines, hydrazide compounds, amidine and/or guanidine compounds, and (B) a member selected from the group consisting of
   (a) higher molecular aliphatic and/or aromatic polyamines with molecular weights of 400 to 6000, preferably 800 to 3000,
   (b) aromatic polyamines with molecular weights of 108 to 399, preferably diamines and
   (c) mixtures thereof, and (v) wherein the adhesion reaction is activated by heat, polar solvents and/or by high shearing forces.

If desired, the composition can also contain (i) polyhydroxyl compounds having molecular weights of from 400 to 6000, (ii) aliphatic and/or cycloaliphatic polyols having molecular weights of from 62 to 399, or (iii) mixtures thereof.

Any diisocyanates or polyisocyanates or mixtures thereof are suitable as starting components for the surface-modified stabilized, polyisocyanates (A) according to the invention, providing they have a melting point above 40° C., preferably above 80° C., and most preferably above 130° C. These isocyanates may be aliphatic, cycloaliphatic, araliphatic, heterocyclic, and, preferably, aromatic polyisocyanates. Also useful are polyphenyl polymethylene polyisocyanates, obtained by aniline formaldehyde condensation and subsequent phosgenation as described in British Pat. Nos. 874,430 and 848,671; perchlorinated aryl polyisocyanates: polyisocyanates containing carbodiimide groups; polyisocyanates containing allophanate groups; polyisocyanates containing isocyanurate groups; polyisocyanates containing urethane or urea groups; polyisocyanates containing acylated urea groups; polyisocyanates containing biuret groups; polyisocyanates produced by telomerization reactions; polyisocyanates containing ester groups; diisocyantes preferably containing uretdione groups; and diisocyanates containing urea groups. Examples of suitable polyisocyanates include:

| | |
|---|---|
| p-xylylene diisocyanate | Mp.: 45–46° C. |
| 1,5-diisocyanatomethylnaphthalene | 88–89° C. |
| 1,3-phenylene diisocyanate | 51° C. |
| 1,4-phenylene diisocyanate | 94–96° C. |
| 1-methylbenzene-2,5-diisocyanate | 39° C. |
| 1,3-dimethylbenzene-4,6-diisocyanate | 70–71° C. |
| 1,4-dimethylbenzene-2,5-diisocyanate | 76° C. |
| 1-nitrobenzene-2,5-diisocyanate | 59–61° C. |
| 1,4-dichlorobenzene-2,5-diisocyanate | 134–137° C. |
| 1-methoxybenzene-2,4-diisocyanate | 75° C. |
| 1-methoxybenzene-2,5-diisocyanate | 89° C. |
| 1,3-dimethoxybenzene-4,6-diisocyanate | 125° C. |
| azobenzene-4,4'-diisocyanate | 158–161° C. |
| diphenylether-4,4'-diisocyanate | 66–68° C. |
| diphenylmethane-4,4'-diisocyanate | 42° C. |
| diphenyl-dimethylmethane-4,4'-diisocyanate | 92° C. |
| naphthalene-1,5-diisocyanate | 130–132° C. |
| 3,3'-dimethylbiphenyl-4,4'-diisocyanate | 68–69° C. |
| diphenyldisulphide-4,4'-diisocyanate | 58–60° C. |
| diphenylsulfone-4,4'-diisocyanate | 154° C. |
| 1-methylbenzene-2,4,6-triisocyanate | 75° C. |
| 1,3,5-trimethylbenzene-2,4,6-triisocyanate | 93° C. |
| triphenylmethane-4,4',4''-triisocyanate | 89–90° C. |
| 4,4'-diisocyanato-(1,2)-diphenylethane | 88–90° C. |
| dimeric 1-methyl-2,4-phenylene diisocyanate | 156° C. |
| dimeric 1-isopropyl-2,4-phenylenediisocyanate | 125° C. |
| dimeric 1-chloro-2,5-phenylene diisocyanate | 177° C. |

-continued

| | |
|---|---|
| dimeric 2,4'-diisocyanato-diphenylsulphide | 178–180° C. |
| dimeric diphenylmethane-4,4'-diisocyanate | |
| 3,3'-diisocyanato-4,4'-dimethyl-N,N'—diphenylurea | |
| 3,3'-diisocyanato-2,2'-dimethyl-N,N'—diphenylurea | |
| N,N'—bis[4(4-isocyanatophenylmethyl)phenyl]urea | |
| N,N'—bis[4(2-isocyanatophenylmethyl)phenyl]urea. | |

Dimeric 1-methyl-2,4-diisocyanatobenzene, dimeric 4,4'-diisocyanato-diphenylmethane, 3,3'-dimethyl-4,4'-diisocyanato-diphenyl, 3,3'-diisocyanato4,4'-dimethyl-N,N-diphenylurea, bis-N,N'-[4-(4-isocyanatophenylmethyl)-phenyl]-urea, 1,5-naphthalenediisocyanate and 1,4-phenylene diisocyanate are particularly preferred. The dimeric diisocyanates can also be prepared in finely divided form by in situ dimerization, for example in plasticizers, solvents, water or polyols and can optionally be subjected to deactivation in this form.

Suitable methods for deactivation of such polyisocyanates are described in allowed U.S. application Ser. No. 514,410, filed on July 18, 1983, now U.S. Pat. No. 4,483,974.

Suitable stabilizers for reaction with the above-mentioned polyisocyanates in order to deactivate a portion of the isocyanate groups therein include difunctional or polyfunctional lower or higher molecular compounds with aliphatically bound primary and/or secondary amino groups and molecular weights of 60 to 6000, preferably 60 to 3000. These are lower molecular and/or higher molecular primary and/or secondary polyamines, preferably with functionalities of 2 or of 2 to 3, or mixtures thereof. Particularly preferred are diamines. The amino groups are bound to aliphatic groups (including cycloaliphatic groups or on the aliphatic radical of araliphatic groups). The aliphatic and cycloaliphatic diamines and polyamines can optionally contain in addition to the amino groups, OH-groups, tertiary amino groups, ether groups, thioether groups, urethane groups, urea groups, carboxyl groups, carboxylic acid alkyl ester groups, sulphonate groups, carboxylate groups or sulphonic acid ester groups.

Suitable diamines and polyamines for such deactivation according to the invention include diamines, triamines and higher amines such as, for example, ethylene diamine; 1,2- and 1,3-propane diamine; 1,4-butane diamine: 1,6-hexane diamine; neopentane diamine: 2,2,4- and 2,4,4-trimethyl-1,6-diaminohexane; 2,5-dimethyl-2,5-diaminohexane; 1,10-decane diamine; 1,11-undecane-diamine, 1,12-dodecane diamine; bisaminomethyl-hexahydro-4,7-methano-indane (TCD-diamine); 1,3-cyclohexane diamine; 1,4-cyclohexane diamine; 1-amino-3,3,5-trimethyl-5-aminomethyl-cyclohexane (isophorone diamine); 2,4- and/or 2,6-hexahydrotoluylene diamine; 2,4'- and/or 4,4'-diaminodicyclohexylmethane; m- or p-xylylene diamine; bis-(3-aminopropyl)-methylamine; bis-N,N'-(3-aminopropyl)-piperazine; 1-amino-2-aminomethyl-3,3,5-(3,5,5)-trimethylcyclopentane; 2,2-dialkylpentane-1,5-diamines; 1,5,11-triaminoundecane; 4-aminomethyl-1,8-diaminooctane; lysinemethylester; cycloaliphatic triamines as described in German Offenlegungsschrift No. 2,614,244; 4,7-dioxadecane-1,10-diamine; 2,4- and 2,6-diamino-3,5-diethyl-1-methylcyclohexane and mixtures thereof; alkylated diaminodicyclohexylmethanes such as 3,3'-dimethyl-4,4'-diaminodicyclohexylmethane or 3,5-diisopropyl-3',5'-diethyl-4,4'-diaminodicyclohexylmethane; perhydrated diaminonaphthalenes; perhydrated diaminoanthrazenes; diethylene triamine; triethylene tetramine; pentaethylene hexamine; dipropylene triamine; tripropylene tetramine; N,N'-dimethyl-ethylene diamine; 2,5-dimethyl-piperazine; 2-methylpiperazine; piperazine(hydrate); 2-hydroxyethylpiperazine; 2-(2-aminoethyl)aminoethylsulphonic acid sodium; and the like.

Instead of, or in addition to, these lower molecular aliphatic diamines, it is also possible to use higher molecular aliphatic diamines and polyamines of the type which can be obtained, for example, by reductive amination of polyoxyalkylene glycols with ammonia as described in Belgian Pat. No. 634,741 or U.S. Pat. No. 3,654,370. Further higher molecular polyoxyalkylene polyamines can be prepared by methods of the type enumerated in the company brochure "Jeffamine, Polyoxypropylene amines" published by Texaco Chemical Co., 1978, for example by hydration of cyanethylated polyoxyalkylene glycols (German Offenlegungsschrift No. 1,193,671); by amination of polypropylene glycol sulphonic acid esters (U.S. Pat. No. 3,236,895); by treatment of a polyoxyalkylene glycol with epichlorohydrin and a primary amine (French Pat. No. 1,466,708); or by reaction of NCO-prepolymers with hydroxyl group containing enamines, aldimines or ketimines and subsequent hydrolysis as described in German Auslegeschrift No. 2,546,536. Suitable higher molecular aliphatic diamines and polyamines also include the polyamines obtainable according to German Offenlegungsschriften Nos. 2,948,419 and 3,039,600 by alkaline hydrolysis of NCO-prepolymers (with aliphatic diisocyanates) via the carbamate stage. These higher molecular polyamines have molecular weights of from 400 to 6000, preferably from 400 to 3000 and most preferably from 1000 to 3000. Due to their structure, these higher molecular polyamines are particularly suitable for forming a non-brittle, elastic polyurea covering on the polyisocyanate surface. They are therefore used for amine stabilization of the polyisocyanate particles preferably mixed with the lower molecular diamine and polyamino compounds.

Suitable stabilizers or deactivators for the above-mentioned polyisocyanates also include hydrazine, alkylhydrazines as well as N,N'-dialkylhydrazines, preferably with $C_1$-$C_6$-alkyl groups which can carry chlorine or OH-groups as further substituents, and/or difunctional or polyfunctional lower or higher molecular compounds with terminal —CO—NH—NH$_2$ groups. These stabilizers have molecular weights of 32 to about 6000. These include, for example, hydrazine (usually in the form of hydrazine hydrate), alkyl-substituted hydrazines (for example, methyl hydrazine, ethyl hydrazine, hydroxyethyl hydrazine or N,N'-dimethyl hydrazine). Further suitable stabilizers include compounds with terminal hydrazide groups. Suitable hydrazide group-containing materials include, for example, dihydrazides or polyhydrazides such as carbodihydrazide; hydracrylic acid hydrazide; oxalic acid dihydrazide; adipic acid dihydrazide; terephthalic acid dihydrazide; isophthalic acid hydrazide; compounds with hydrazide and semicarbazide, carbazine ester or amino groups, such as β-semicarbazido propionic acid hydrazide, 2-semicarbazidoethylene carbazine ester, aminoacetic acid hydrazide, or β-amino propionic acid hydrazide; or biscarbazine ester or bis-semicarbazides such as ethylene-bis-carbazine ester or ethylene bis-semicarbazide or isophorone-bis-semicarbazide. Hydrazine and lower molecular compounds with —CH—NH—NH$_2$ groups having molecular weights of 32 to 399 are preferred. Hydrazine hydrate and β-semicarbazido-propionic acid hydrazide as well as alkylene bis-semicarbazides are particularly preferred.

Polyisocyanates having surprisingly retarded reactivity can also be prepared by reaction of solid, finely divided polyisocyanates with acyclic, monocyclic or bicyclic amidines or guanidines containing no hydrogen atoms which are reactive towards isocyanates. The surface covering formed is apparently a mono- or polyaddition product (of unknown structure) of isocyanate and amidine or guanidine compound in a thin layer. The reaction products which are formed in this way are surprisingly retarded in their reactivity and are split back into the starting components only after an adequate rise in temperature. The deactivated polyisocyanates can form with the reaction components containing active hydrogen atoms (in particular the polyamines, optionally with addition of polyols) storage-stable one component systems. They react with these reaction components only above the thickening temperature. The thickening temperature is usually substantially lower than the splitting or deblocking temperature of uretdione diisocyanates or blocked polyisocyanates. The amidine or guanidine compounds also liberated during the thermal splitting then act as catalysts in the form of a solution or a melt for the remaining reactions, and can accelerate the reaction or trigger other reactions (for example the uretdione ring cleavage). This is why such amidine/guanidine deactivation is particularly preferred.

The catalytic effect of the amidine or guanidine compounds often cited in patent literature was surprisingly not observed, however, when using solid polyisocyanates, in suspension (in higher molecular aromatic polyamines or higher molecular polyols with addition of aromatic polyamines) and when the temperature of the suspension containing the solid polyisocyanate was relatively low (for example, below 60° C., preferably at ambient temperature up to about 50°, i.e. below the thickening temperature). Instead, it was found that considerable deactivation of the isocyanate polyaddition reaction between NCO and OH or NH$_2$ groups was initiated under these conditions. It was also found that the reactivity of the solid polyisocyanates towards compounds with active hydrogen atoms is surprisingly lower, the more amidine there is present in the reaction mixture. This would be quite unexpected when using amidines as catalysts according to the prior art. The deactivation of the solid polyisocyanates by amidines is so pronounced that even the reaction between isocyanates and aromatically bound amino groups (which is known to start rapidly at ambient temperature) is suppressed completely at ambient temperature. A reaction took place only on reaching a specific temperature (the so-called thickening point). The components react quickly only above this thickening temperature and are even considerably accelerated by the presence of the amidine catalysts which are liberated.

Preferred solid polyisocyanates with retarded reactivity which are stabilized by surface modification are obtained, in particular, by reacting polyisocyanates with melting points above 40° C. (preferably above 80° C.) in finely divided form, preferably with a particle size of 0.5 to 200 μm (and most preferably 1 to 50 μm) with acyclic, monocyclic or bicyclic compounds which contain at least one amidine and/or the guanidine group

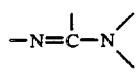
(I)

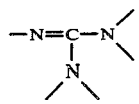
(II)

and which do not contain hydrogen atoms reactive towards isocyanates at ambient temperature. The amidine/guanidine compounds are used in a quantity of 0.1 to 25 equivalent percent of amidine/guanidine groups (preferably 0.3 to 8 equivalent percent) in a liquid medium (preferably a lower and/or higher molecular aromatic polyamine, a lower and/or higher molecular polyol, a plasticizer and/or water).

The acyclic, monocyclic or bicyclic amidine or guanidine compounds are also abbreviated in the present application as amidine/guanidine compounds or compounds with amidine/guanidine groups, or quite simply as amidine/guanidine stabilizers.

The amidines to be used as surface-modifying stabilizers are acyclic or cyclic amidines, preferably those corresponding to the formulae (III) to (VII);

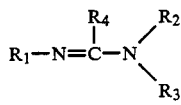
(III)

wherein $R_1$ and $R_4$ may be the same or different, and represent H; a straight-chained or branched aliphatic hydrocarbon radical with 1 to 18 carbon atoms (preferably 1 to 4 carbon atoms); a cycloaliphatic hydrocarbon radical with 5 to 7 ring carbon atoms; an araliphatic radical; or an aromatic radical, preferably with 6–10 C atoms in the aromatic radical and optionally 1–18 C-atoms in the aliphatic portion; any of which radicals may contain substituents inert to isocyanates and/or may be interrupted by structural units of —O—, —S— or —N-alkyl, preferably —N—$C_1$-$C_4$-alkyl, or —N-cycloalkyl, preferably —N—($C_5$-$C_7$-cycloalkyl—) and $R_2$ and $R_3$ represent radicals which may be the same as or different from $R_1$, alkylene-(preferably $C_2$-$C_{12}$—) —N—(dialkyl) radicals or alkylene-N-(dicycloalkyl)-(preferably di-$C_1$-$C_7$-cycloalkyl—) radicals, (preferably —$(CH_2)_n$—N—($C_{16}$ to $C_6$—alkyl)$_2$ radicals), where n=2–6 but may not be H.

The amidines particularly preferably represent monocyclic or bicyclic amidines in which two respective radicals are $R_1$ to $R_4$ can be linked to each other and in which several amidine radicals may be bonded via polyvalent radicals.

One group of preferred cyclic amidines are those which correspond to formula (IV)

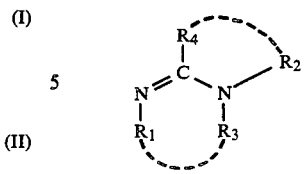
(IV)

wherein the radicals $R_1$ and $R_3$ together and/or the radicals $R_2$ and $R_4$ together represent an alkylene radical (which may be branched) which contains 2 to 5 carbon atoms optionally containing heteroatom (groups) such as —O—, —S— or —N—alkyl, (preferably N($C_1$-$C_6$)alkyl-)groups. It is preferred that $R_1$ and $R_3R$ and/or $R_2$ and $R_4$ represent a —$(CH_2)_2$— or —$(CH_2)_3$— radical.

Also preferred are amidines corresponding to the formula (V)

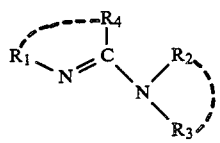
(V)

wherein the radicals $R_1$ and $R_4$ together and/or the radicals $R_2$ and $R_3$ together represent an alkylene radical (which may be branched) which contains 2 to 5 carbon atoms and may contain heteroatoms. The —$(CH_2)_2$— and —$(CH_2)_3$— radicals are preferred.

Also preferred are cyclic amidines corresponding to formula (VI)

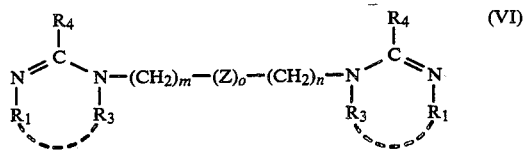
(VI)

wherein

Z represents an N-alkyl group, preferably an —N(-$C_1$-$C_6$)-alkyl group, a straight-chain or branched $C_2$ to $C_{14}$ alkylene radical (which can optionally be interrupted in the chain by —O—), a cycloalkane radical with 5 to 8 ring members or a dicyclohexyl-($C_1$ to $C_4$ alkane) radical, and m and n may be the same or different and represent integers from 2 to 10 (preferably 2 or 3) and o represents zero or 1.

Particularly preferred amidines are also those corresponding to formula (VII)

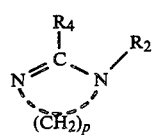
(VII)

wherein p=2, 3 or 4, $R_4$ represents a straight-chain or branched $C_1$-$C_4$ alkyl (for example, methyl, ethyl, isopropyl or tertiary butyl), and $R_2$ represents a straight-chain or branched $C_1$-$C_4$ alkyl, —$(CH_2)_p$—N—$(R_4)_2$ or $C_5$-$C_7$ cycloalkyl.

Examples of acyclic amidines include: N,N-dimethyl-formamidine; N,N-dimethylacetamide; N,N-diethyl-formamidine; N,N,N'-trimethylacetamidine; N,N-dimethyl-N'-benzylacetamidine; N,N-dicyclohexyl-N'-methyl-acetamidine; N,N-dimethyl-N'-cyclohexyl-formamidine; and N,N-dimethyl-N'-tert.-butyl-formamidine.

Examples of particularly preferred monocyclic amidines (IV) include: 1,2-dimethyl-Δ2-imidazoline; 1-methyl-2-phenyl-Δ2-imidazoline; 1(N)-methyl- 2-imidazoline; 2-benzylimino-N-methyl-caprolactam; 2-butylimino-N-methyl-butyrolactam: 1,8-diaza-bicyclo[5,3,0]-dec-7-ene: 1,8-diaza-bicyclo[5,4,0]-undec-7-ene; 1,7-diaza-bicyclo[4,4,0]-dec-6-ene; 1,6-diaza-bicyclo[3,4,0]-non-5-ene; 1,5-diaza-bicyclo[4,3,0]-non-5-ene; 1,14-diaza-bicyclo[11,4,0]-heptadec-13-ene; 1-(N)-methyl-Δ2-tetrahydropyrimidine; 1-cyclohexyl-2-methyl-Δ2-tetrahydropyrimidine; 1-cyclohexyl-Δ2-tetrahydropyrimidine; 1-benzyl-2-butylΔ-tetrahydropyrimidine; 1-methyl-2-methyl-Δ2-tetrahydropyrimidine; 1-butyl-2-methyl-Δ2-tetrahydropyrimidine; 1-(2-ethylhexyl)-2-methyl-Δ2-tetrahydropyrimidine; 1-dodecyl-2-methyl-Δ2-tetrahydropyrimidine; 1-(1-methyl-cyclohexyl)-2-methyl-Δ2-tetrahydropyrimidine; 1-(2-methyl-hexyl)-2-methyl-Δ2-tetrahydropyrimidine; and 1-(3,3,5-trimethylcyclohexyl)-2-methyl-Δ2-tetrahydropyrimidine.

These compounds can be synthesized, in particular, in accordance with the details in German Auslegeschrift No. 2,439,550.

Particularly preferred amidines include those of type (IVa)

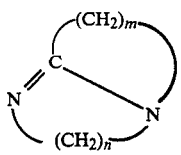

(IVa)

wherein
m represents 2, 3, 4, 5 or 11 and
n represents 2, 3, or 4.

The preparation of a number of these compounds is described, for example, in German Pat. No. 1,545,855.

Compounds of type (IV) with a dialkylaminoalkyl lateral group $R_2$ include, for example, 1-(3-N,N-dimethylaminopropyl)-2-methyl-2-tetrahydropyrimidine, and 1-(2-N,N-dimethylaminoethyl)-2-methyl- 2-tetrahydropyrimidine, and are prepared in accordance with details in German Auslegeschrift No. 3,049,131.

Examples of the amidine corresponding to formula (V) include 1-methyl-4-(2-tetrahydroazepinyl)-piperazine

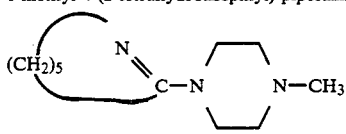

phenyl-methyl-(2-tetrahydroazepinyl)-amine

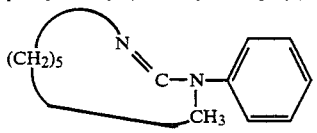

benzyl-methyl-(2-tetrahydroazepinyl)-amine

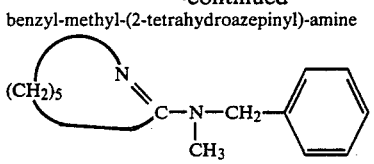

4-(2-tetrahydroazepinyl)-morpholine

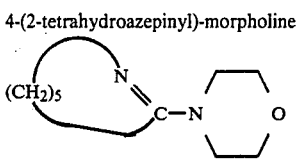

The cyclic or bicyclic amidines which may be formed by linking two respective radicals are described in German Auslegeschrift No. 2,722,514.

General instructions for the synthesis of amidines are given in Houben-Weyl, Methoden der Organischen Chemie, Volume XI, 2, pages 38 to 66, Verlag, G. Thieme, Stuttgart 1958.

Compounds of the type corresponding to formula (VI) include, for example,

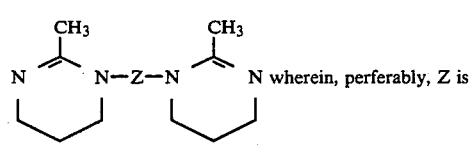 N wherein, perferably, Z is

—(CH$_2$)$_2$—

—(CH$_2$)$_6$—

—(CH$_2$)$_3$—N—(CH$_2$)$_3$—
               |
              CH$_3$ (CH$_2$)$_6$NH—CO—O(CH$_2$)$_3$O(CH$_2$)$_3$O—CO—NH(CH$_2$)$_6$ or

—(CH$_2$)$_2$—O—(CH$_2$)$_2$—.

These compounds are obtained by the methods indicated in German Auslegeschrift No. 3,049,131.

Guanidines can also be used as surface-modifying stabilizers for solid polyisocyanates. They include acyclic or cyclic guanidines and also diguanides or triguanides as well as compounds which can carry the guanidine radical several times. Preferred are those corresponding to the formula (VIII)

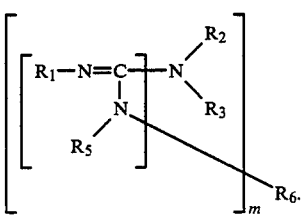

(VIII)

In Formula (VIII):
m=1 or 2, and
n=1, 2 or 3 (preferably 1), when m=1, and 1 when m=2.
$R_1$, $R_2$, $R_3$ represent radicals of the type described for the amidines in formula (III).
$R_5$ has the same meaning as $R_2$, and $R_6$ represents either a monovalent radical of the type mentioned for $R_2$ or a divalent $C_2$-$C_{12}$-alkylene radical which can optionally be interrupted by —O—, N—$C_1$-$C_{18}$—alkyl or —N—$C_5$-$C_7$—cycloalkyl radicals. When n=1, two of the radicals $R_1$, $R_2$, $R_3$, $R_5$ and $R_6$ can also be linked to each other so that cyclic guanidines of the following structures are also formed

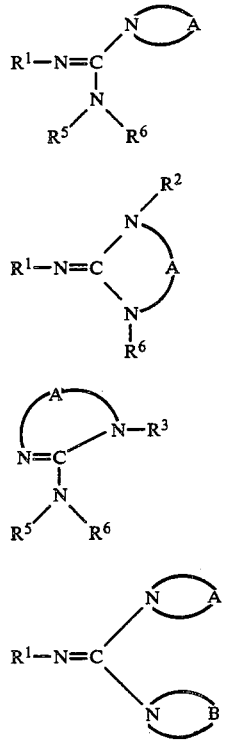

(VIII-a)

(VIII-b)

(VIII-c)

(VIII-d)

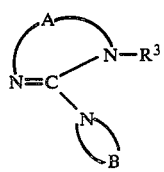

(VIII-e)

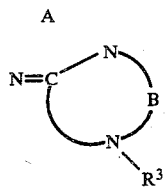

(VIII-f)

In formulae (VIIIa to VIIIf) the groups A and B formed by linkage between two respective substituents represent divalent, aliphatic, cycloaliphatic, araliphatic or aromatic radicals which are at least two-membered (preferably containing 2 to 5 chain members), and which can optionally also be interrupted by heteroatoms (—O—, —S—, N(alkyl)—) or can be substituted with substituents which are inert towards isocyanates (for example halogen, alkyl).

Further suitable guanidines are listed in the following compilation.

It should be pointed out that the amidines and guanidines for which $R_1$ is hydrogen, do not normally react with isocyanates at this (HN=)-group at ambient temperature.

| Substituents at the nitrogen | Substituted X times | In the following guanidine basic frame-works |
|---|---|---|
| Methyl-, Ethyl-, (Iso)propyl-, (Iso)butyl-, (tert.)-Butyl-, (Iso)pentyl-, Hexyl-, 2-Ethylhexyl-, Octyl-, Dodecyl-, Stearyl-, Ethoxypropyl-, Butoxyhexyl-, Cyanoethyl-, Cyanohexyl-, Butoxycarbonyl-methyl-, Methoxycarbonylmethyl-, Dimethylaminopropyl-, Cyclopentyl-, Cyclohexyl-, (Chlor)Benzyl-, Phenethyl-, Phenyl-, Tolyl-, Methoxyphenyl-, Ethoxycarbonylphenyl-, | tetra- | (NH-substituted guanidine) |
| | penta- | (N-substituted guanidine) |
| | tri- | (5-membered cyclic guanidine) |
| | tri- | (6-membered cyclic guanidine) |
| | tri- | ($(CH_2)_5$ ring cyclic guanidine) |

| Substituents at the nitrogen | Substituted X times | In the following guanidine basic frame-works |
|---|---|---|
| | mono- | 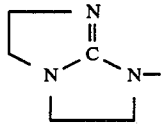 |
| | mono- | 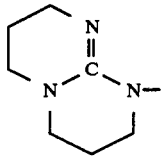 |
| | mono- | 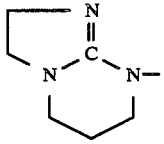 |

Further examples include imino carboxylic acid-bis(sec.)-amides of the following composition

| methylimino-, ethylimino-, cyanethylimino-, dibutylaminobutylimino-, hexylimino- stearylimino cyclohexylimino benzylimino- phenylimino- p-chlorbenzylimino- 4-methyl-benzylimino- | carboxylic acid | -bis-morpholide -bis-piperidide -bis-N'—methyl- piperazide |
|---|---|---|

Particularly suitable cyclic guanidine compounds are reproduced in the following formulae:

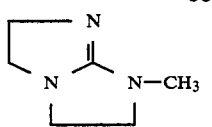

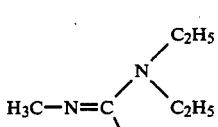

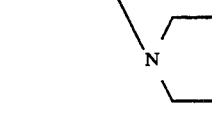

-continued

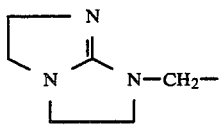

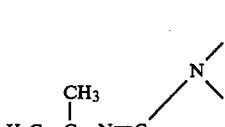

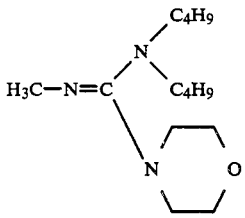

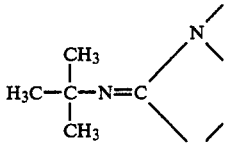

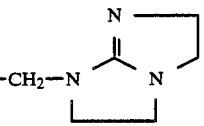

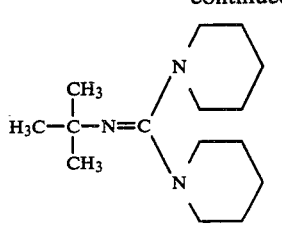

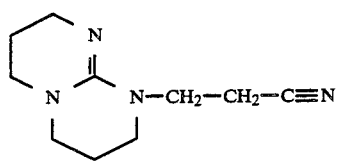

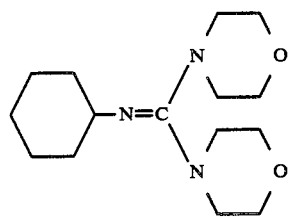

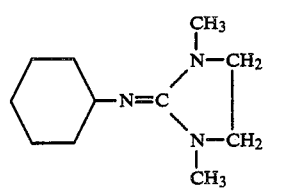

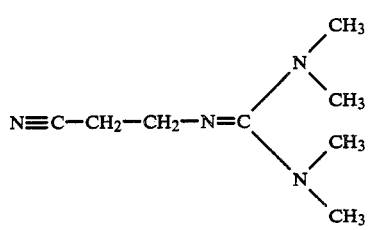

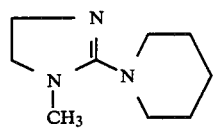

Particularly preferred guanidine stabilizers include tetramethyl guanidine, pentamethyl guanidine, as well as the following cyclic guanidine compounds

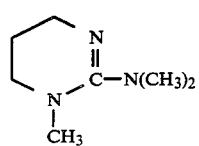
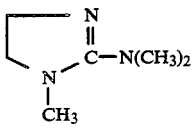

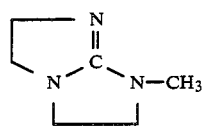
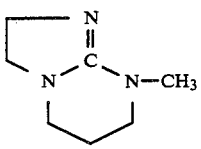

Instead of the free compounds, acid addition salts of amidines or guanidine can be used, but these salts are generally less preferred. The term "acid addition salts" also includes salts formed with acids as well as salts formed with other proton donor compounds. Typical acids for the production of these salts include monocarboxylic acids such as formic acid, acetic acid, propionic acid, butyric acid, capronic acid, valeric acid, octylic acid, lauric acid, stearic acid, oleic acid: dicarboxylic acids, such as oxalic acid, malonic acid, succinic acid, fumaric acid, adipic acid; hydroxylic acids, such as glycolic acid, lactic acid, tartaric acid and the like: sulphonic acids such as alkyl or aryl sulphonic acids, sulphaminic acids, sulphanilic acids; inorganic acids such as carbonic acid, phosphoric acid, hydrochloric acid, sulphuric acid and the like and other proton donor compounds such as sulphonamides; phenols such as phenol, cresol or thiophenols; enols, such as barbituric acid, uric acid and the like. Fatty acids with at least two carbon atoms and phenols are particularly preferred.

When using acyclic mono- or bicyclic amidines or guanidines to deactivate the solid polyisocyanate, a sometimes considerable increase in the surface stabilization effect is observed if small quantities of water, lower molecular glycols or amines are added to the reaction mixture. The advantage of this operation is that the desired stability in storage of the reactive adhesive mixture is achieved even with a small addition of amidine.

The amidines or guanidines used to deactivate solid polyisocyanates effect considerable stabilization of the isocyanates, even relative to aromatically or aliphatically bound $NH_2$ groups (for example in higher molecular aliphatic polyamines), but then develop their catalytic effect completely during thermal crosslinking above the thickening temperature. Additions of further catalysts can therefore generally be omitted.

The amidine/guanidine stabilizers can also be used in mixture with the amine stabilizers and the above-mentioned hydrazine, alkyl hydrazine or hydrazide compounds.

The stabilizers are used in a quantity of 0.1 to 25 equivalent percent per amine or amidine/guanidine group per equivalent NCO in the polyisocyanate, preferably 0.1 to 8 equivalent percent, and most preferably 0.3 to 3 equivalent percent. The polyadduct covering can also be produced with even higher proportions (for example 30 equivalent percent per NCO) but the proportions of reactive isocyanate groups may be reduced too much for effective use as a reactive adhesive. With hydrazine, an —$NH_2$—group is one amine equivalent, while a —NH—alkyl group is one amine equivalent for an alkyl hydrazine derivative, and a —CO—NH—$NH_2$ group is one amine equivalent for a hydrazide compound.

Temperatures below the respective melting temperature of the polyisocyanate are generally selected for the deactivation reaction. They generally lie below 70° C., and preferably from 0° to 50° C.

The stabilization of the solid polyisocyanates is mostly carried out in a liquid medium which is not a good solvent for the solid polyisocyanate.

The liquid medium can consist of (i) lower molecular weight and/or preferably higher molecular weight mono- and/or (preferably) polyols, and/or (ii) aromatic polyamines having molecular weights of from 62 to 6000 and/or higher molecular weight aromatic (and during subsequent suspension or in limited quantities also higher molecular aliphatic) polyamines with molecular weights of from 400 to 6000. Higher molecular polyols and/or in particular, aromatic higher molecular polyamines in the molecular weight range of from 400 to 6000, preferably 400 to 3000, and most preferably 1000 to 3000 are preferably used, optionally with addition of lower molecular polyols and/or aromatic lower molecular polyamines.

Examples of the mono-alcohols as liquid medium include longer chain alcohols such as isohexadecanol, also propoxylation products of monohydric alcohols with molecular weights preferably of 400 to 6000, for example propoxylation products of n-butanol. These mono-alcohols are less preferred however, because they cannot continue to be used directly as suspension agent for polyisocyanates as they represent chain stoppers. They therefore have to be removed in an additional stage before the stabilized polyisocyanates are used in the reactive systems. Suitable lower molecular polyols include, for example, butanediol-1,4, decanediol-1,10, neopentylglycol, tetra-(hydroxypropyl)-ethylene diamine or castor oil.

Plasticizer-type compounds can also be used as liquid medium during the stabilization of polyisocyanates. Examples include, for example, phthalates such as dioctyl, diisododecyl, dibenzyl, butylbenzyl, phthalate and phosphates with up to 8 carbon atoms in the alkyl radical such as trioctyl phosphate. Hydrocarbons such as so-called butadiene oils or polyethers of higher molecular weight can also be used as reaction medium. In general, the finely divided solid isocyanate is stirred into a solution of the stabilizer in the plasticizer (if used) at ambient temperature. If desired, further components such as, for example, higher molecular aromatic polyamines, can be added after the stabilization of the polyisocyanates. Isolation of the stabilized polyisocyanates, for example, by filtration, and subsequent suspension thereof in the higher molecular polyol and polyamine compounds is possible though not preferred.

Surprisingly, water is also suitable as liquid medium, the stabilizers being added to the water and the solid polyisocyanates being mixed with this solution.

When using water as the liquid medium, the stabilized polyisocyanate is generally isolated by filtration, optionally carefully dried and mixed, in the isolated finely powdered form, with the desired higher molecular polyamines and/or polyols and optionally further components for the adhesive mixtures. This intermediate stage of isolation of the stabilized polyisocyanates is not preferred, however.

Solvents of a non-polar or only slightly polar nature, for example aliphatic, cycloaliphatic or aromatic hydrocarbons, halogen hydrocarbons, ethers, ketones or esters, preferably with boiling points below 146° C. can optionally be added to the above-mentioned liquid media (polyols, polyamines, plasticizers or water). A reaction in a lower viscosity medium can be achieved in this way. These solvents are preferably removed (preferably by vacuum). The stabilization reaction can also be carried out in minimally polar solvents which are not capable of significantly dissolving the polyisocyanates, for example in hydrocarbons, the stabilization products being isolated by filtration or removal of the solvent and subsequently being suspended in the higher molecular polyols and/or polyamines.

The above-mentioned stabilization reactions lead to a suspension of surface-modified stabilized solid polyisocyanates in the liquid medium.

The stabilization reaction is preferably carried out in one of the reaction components and most preferably in a mixture such that the adhesive is directly obtained.

It is preferred that liquid or low melting (<50° C.), higher molecular aromatic polyamines and/or higher molecular aliphatic polyamines are used as component (B). Suitable higher molecular polyamino compounds (B)(a) with aromatic amino groups having molecular weights of 400 to 6000 include, in particular, those polyamino compounds of the type which can be produced by hydrolysis of corresponding NCO prepolymers based on higher molecular polyhydroxyl compounds and excess aromatic diisocyanates by (preferably basic) hydrolysis. Examples of this process are described in DE-A No. 2,948,419, DE-A No. 3,039,600, DE-A No. 3,112,118, EP-A No. 61,627, EP-A No. 71,132, EP-A No. 71,139 and EP-A No. 97,869. (DE-A represents a German Auslegeschrift and EP-A represents a European patent.) The first publication also mentions other processes of the prior art for the production of aromatic amino compounds of higher molecular weight of a type which are suitable for the process according to the present invention. The processes in DE-A No. 2,948,419 and the other cited patents relate to polyether polyamines, as well as polyester, polyacetal, polythioether or polycaprolactone polyamines. Preferred are di- or trifunctional polyamines which contain urethane groups (from the reaction of the corresponding higher molecular polyhydroxyl compounds with the excess polyisocyanates) and bear the amino groups on the radical of the former polyisocyanate. However, the polyamines can also be produced by other processes, for example, by reaction of NCO-prepolymers with excess quantities of hydrazine, aminophenylethylamine, or other diamines according to German Auslegeschrift No. 1,694,152. Another method of synthesis is described in French Patent No. 1,415,317 by conversion of NCO-prepolymers with formic acid into the N-formyl derivatives and the saponification thereof. The reaction of NCO-prepolymers with sulphaminic acid according to German Auslegeschrift No. 1,155,907 also leads to higher molecular weight polyamines. In addition to amino groups bound on aromatic radicals (from aromatic polyisocyanates), higher molecular (via aliphatic polyisocyanates) polyamino compounds with amino groups bound on aliphatic compounds can also be produced. The higher molecular polyamines can also be pre-extended by reaction with subequivalent quantities of diisocyanates.

The higher molecular aliphatic polyamines of the type already described as higher molecular amine stabilizers can be used both as amine stabilizer and as higher molecular polyamino compound (B)(a) if the stabilization reaction is carried out at low temperatures, for example ambient temperature. The stabilization reaction surprisingly comes to a standstill after less than 25% conversion of all NCO groups. If the temperature is raised above the thickening temperature, for example 120° C., thorough reaction of all aliphatic amino groups with the isocyanate groups takes place.

Lower molecular aromatic polyamines (molecular weight 108 to 399) are less preferred as used by themselves and they are preferably mixed with the higher molecular polyamines (B)(a) as chain extenders.

Reactive adhesive compositions in which the stabilized polyisocyanates (A) are mixed with higher molecular amines (B)(a) and optionally lower molecular polyamine chain extenders (B)(b), in particular aromatic diamines having molecular weights of 108 to 399, represent a particularly preferred adhesive mixture. This adhesive mixture can optionally additionally contain higher molecular polyhydroxyl compounds and/or lower molecular polyols. Reactive adhesive mixtures in which the stabilized polyisocyanates (A) are mixed with higher molecular polyols and with lower molecular weight polyamines, in particular aromatic diamines having a molecular weight of 108 to 399, are also preferred. These mixtures can also contain lower molecular polyols. A further preferred mixture contains (A), higher molecular polyamines (B) and lower molecular polyols (C). The mixture from (B) and (C) contain at least 25 (preferably >50) equivalent-% $NH_2$, related to the sum of ($NH_2$+OH)-equivalents in (B+C). Preferably more than 50 equivalent-% of the endgroups in (B) are $NH_2$-groups.

Suitable higher molecular polyhydroxyl compounds which can be used (both as suspension medium for the polyisocyanates and as further reactive components for the adhesive mixtures) include difunctional or higher functional polyhydroxyl compounds with 2 to 8, preferably 2 to 4 hydroxyl groups and a molecular weight of 400 to 6000. These include at least two hydroxyl group-containing polyesters, polyethers, polythioethers, polyacetals, polycarbonates, polylactones or polyesteramides, as well as polybutadiene compounds or mixtures thereof of the type known per se for the production of homogeneous, optionally cellular or foam-like polyurethanes and listed in German Offenlegungsschrift No. 2,920,501. Polyethers and polyesters are particularly preferred. The polyethers are those of a type known per se and are produced, for example, by polymerization of tetrahydrofuran or epoxides (such as ethylene oxide, propylene oxide, butylene oxide, styrene oxide or epichlorohydrin) or by addition of epoxide compounds, (preferably ethylene oxide or propylene oxide), alone, in a mixture, or in succession, to starting components with reactive hydrogen atoms such as water, polyhydric alcohols, ammonia or polyfunctional amines.

The hydroxyl group-containing polyesters include, for example, reaction products of polyhydric (preferably dihydric and optionally also trihydric) alcohols with polybasic acids (preferably dibasic polycarboxylic acids or anhydrides thereof) or the corresponding polycarboxylic acid esters of lower alcohols.

Polyesters from lactones (for example ε-caprolactone) and polyacetals, polycarbonates or polybutadienes containing terminal hydroxyl groups are also suitable.

Polyhydroxyl compounds in which higher molecular polyadducts or polycondensates or polymers are contained in finely dispersed or dissolved form can also be used. These polyhydroxyl compounds are obtained, for example, if polyaddition reactions (for example reactions between polyisocyanates and amino-functional compounds) or polycondensation reactions (for example between formaldehyde and phenols and/or amines) are allowed to take place in the above-mentioned compounds containing hydroxyl groups.

Polyhydroxyl compounds modified by vinyl polymers of the type obtained, for example, by polymerization of styrene and acrylonitrile in the presence of polyhydroxy polyethers or polycarbonates are also suitable for the process according to the invention.

Further representatives of the above-mentioned hydroxyl compounds to be used are described in detail, for example, in High Polymers, Vol. XVI, "Polyurethanes, Chemistry and Technology", compiled by Saunders-Frisch, Interscience Publishers, New York, London, Volume I, 1962, pages 32 to 42 and pages 44 to 54 and Volume II, 1964, pages 5 to 6 and 198 to 199, and in Kunststoff-Handbuch, Volume VII, Vieweg-Höchtlen, Carl-Hanser-Verlag, Munich, 1966, for example on pages 45 to 71, and in German Auslegeschrift No. 2,854,384.

It is obviously possible to use mixtures of the above-mentioned polyhydroxyl compounds.

Suitable low molecular weight aromatic polyamines (B)(b) (which include those amines containing the amino group found on heterocyclic radicals of aromatic nature) include, for example: p-phenylene diamine: 2,4-/2,6-toluylene diamines; diphenylmethane-4,4'-and/or -2,4'- and/or -2,2'-diamines ; 3,3'-dichloro-4,4'-diaminodiphenylmethane; 3-($C_1$-$C_8$)-alkyl-4,4'-diaminodiphenylmethane; the 3,3,'-di-($C_1$-$C_4$)-4,4'-diaminodiphenylmethanes; the 3,3',5,5'-tetra-($C_1$-$C_4$)-alkyl-4,4'-diphenylmethanes; the 4,4'-diaminodiphenyl-sulphides, -sulphoxides or -sulphones; ether group-containing diamines according to German Auslegeschriften Nos. 1,770,525 and 1,809,172 (U.S. Pat. Nos. 3,654,364 and 3,736,295); 2-halogen-1,3-phenylene diamines optionally substituted in the 5-position (German Auslegeschriften Nos. 2,001,772, 2,025,896 and 2,065,869); bisanthranilic acid esters (German Auslegeschriften 2,040,644 and 2,160,590); 2,4-diaminobenzoic acid ester according to German Auslegeschrift No. 2,025,900; and toluylene diamines substituted by one or two ($C_1$-$C_4$)-alkyl groups. 3,5-diethyl-2,4- and/or -2,6-diaminotoluene (particularly its commercial (80/20) or (65/35) isomer mixtures), unsymmetrical tetraalkyl-substituted diaminodiphenylmethanes (for example 3,5-diethyl-3',5'-diisopropyl-4,4'-diamino diphenylmethane and isomer mixtures thereof corresponding to German Auslegeschrift No. 2,902,090), 4,4'-diaminobenzanilide, 3,5-diamino benzoic acid-($C_1$-$C_4$)-alkylesters, 4,4'- and/or 2,4'-diaminodiphenylmethane and naphthylene-1,5-diamine are particularly preferred.

Diols or diamines with additional groups can also be used. Such compounds include, for example, adipic acid bis-(2-hydroxyethyl)-ester, terephthalic acid bis-(2-hydroxyethyl)-ester, polyols containing sulphonate and/or phosphonate groups, hexamethylenebis-(2-hydroxyethylurethane), 4,4'-diphenylmethane-bis(2-hydroxyethyl urea) or the adduct of Na bisulphite to butene diol-1,4, or the alkoxylation products thereof. Other lower molecular compounds are described in more detail in German Auslegeschrift No. 2,854,384.

Examples of lower molecular weight diols include ethylene glycol; trimethylene glycol; butane diol-2,3 and/or -1,4; hexanediol-1,6; neopentyl glycol; 1,4-bis-hydroxyethyl-cyclohexane: 1,4-dihydroxycyclohexane; terephthalic acid-bis-(β-hydroxyethyl)-ester; 1,4,3,6-dianhydrohexites; 1,4-monoanhydrotetrites; as well as less preferred diols with secondary hydroxyl groups, such as for example, propylene glycol, or pentanediol-2,5. Polyhydroxy compounds include: trimethylol propane: trimethylol ethane; hexane triol-1,2,6; glycerine, pentaerythritol; quinitol; mannitol; sorbitol; castor oil; as well as di-, tri- and tetraethylene, -propylene, and -butylene glycols; bis-(2-hydroxyethyl)-hydroquinone; bis-(2-hydroxyethyl)-resorcinol; formose or formitol. Tertiary amine containing diols or polyols (for example N-methyldiethanolamine, triethanolamine or N,N'-bis-hydroxyethyl piperazine) are also suitable.

Suitable catalysts for the reactive adhesive systems may also be used according to the invention and include the conventional polyurethane catalysts. Organic lead and/or tin compounds have a particularly good effect, particularly when used in combination with conventional polyurethane catalysts such as tertiary amine containing catalysts.

Suitable organic tin compounds include tin-(II) salts or carboxylic acids such as tin acetate, tin octoate, tin 2-ethylhexanoate and tin laurate, and the tin-(IV)-compounds such as dibutyl tin oxide, dibutyl tin dichloride, dibutyl tin diacetate, dibutyl tin dilaurate, and dibutyl tin maleate or dibutyl tin diacetate.

Preferred tin catalysts include sulphur-containing tin compounds such as di-(octyl)-tin-(IV)-bis-thiomethyl or dimethyl tin-(IV)-bis-thiolauryl; dimethyl-tin-bis-thioglycolic acid hexyl ester; or dibutyl tin-bis-thioglycolic acid octyl ester. The above-mentioned catalysts can obviously be used as mixtures, particularly if the low molecular chain extenders and the higher molecular polyols simultaneously bear primary and secondary OH groups. Combinations of organic metal compounds with amino pyridines, hydrazino pyridines (German Auslegeschriften No. 2,434,185, 2,601,082 and 2,603,834) or 1,4-diazabicyclo-2,2,2-octane and/or conventional tertiary amine catalysts of the type usually used in polyurethane chemistry can also be used if desired. The lead catalysts are particularly effective if polyether polyols with secondary hydroxyl groups (for example polypropylene oxide glycols) are used in the system. When using uretdione diisocyanates, additional cross-linking due to cleavage of the uretdione ring can also take place, branching allophanate groups or additional urethane groups being formed during complete cleavage of the uretdione ring.

When using polyols containing mainly primary hydroxyl groups, on the other hand, the tin compounds, particularly the tin/sulphur catalysts are particularly effective. With $NH_2$-group-containing polyethers, catalysis can usually be omitted completely. The catalysts, when used, are generally used in a quantity of 0.001 to 5% by weight, preferably 0.01 to 2% by weight based on the weight of all the components.

Auxiliaries and additives which can optionally be used include: dyes or pigments; fillers such as silica gel, gypsum, talcum, activated carbon, powdered metal; UV absorption agents or stabilizers, such as phenolic antioxidants, light-proofing agents; blowing agents, such as $CO_2$, or fluorochloro-alkanes; surface-active additives, such as emulsifiers; flame-proofing agents or fungistatically and/or bacteriostatically acting substances.

The $NCO/(NH_2+OH)$ equivalent ratio for the adhesive of the present invention is from 0.5:1 to 1.5:1, preferably 0.8:1 to 1.5:1, and most preferably 0.95:1 to 1.2:1. The NCO equivalents are determined from the free NCO from any polyisocyanate stabilized with amines or from the sum of free NCO groups and NCO groups reacted with amidine/guanidine.

From 0.1 to 10 (preferably 0.3 to 8 and most preferably 0.50 to 5) equivalents of $(OH+NH_2)$ equivalents of lower molecular weight polyamines or polyols are used per $(OH+NH_2)$ equivalent of higher molecular polyamines and/or polyols.

Diisocyanates containing uretdione rings can generally be considered as diisocyanates so that only the free NCO groups are taken into consideration. Under certain experimental conditions (use of tertiary amine or lead catalysts and/or higher processing temperature, for example, higher than 140° C.), the uretdione ring may take part in the reaction (additional linkage points via allophanate or biuret groups).

Depending on the viscosity or melting behavior of the starting components, liquid or easily melting one component reactive adhesive mixtures are obtained at an ambient temperature. These reactive mixtures represent a heterogeneous suspension of the solid, stabilized isocyanates in the polyamine and optionally polyol components. When using only the aromatic polyamine compounds (which are clearly more reactive towards NCO groups), however, addition of catalysts can be omitted.

Another feature of the one component reactive adhesives is that the solidification of the stabilized system begins above the thickening temperature. Thus, on the one hand, long processing times and flow paths to just below this temperature are possible. On the other hand, however, due to the thickening immediately following once the thickening temperature has been exceeded, the adhesive is prevented from flowing from the surfaces to be joined. The very long storage time of the reactive systems even at relatively high storage temperatures is also an advantage. The advantage over the prior art (in which a delay in reaction is achieved in one component systems only as the result of heterogeneity of one or more components) is considerably further improved by the protection afforded by the polyadduct covering the "protection" only being removed by the thermal treatment, by application of the shearing forces or by use of high polarity solvents.

The one component systems according to the invention can also be caused to solidify by applying high shearing forces, the skin located on the isocyanate particle surface being destroyed by the mechanical stresses during the shearing process.

The one component systems according to the invention can also be substantially solidified by thermal impact. At ambient temperature or slightly elevated temperature, cross-linking does not take place even in the presence of strongly acting catalysts, so even catalyst-containing mixtures are stable for prolonged periods.

To modify the adhesives to be used according to the invention, natural or synthetic resins, preservatives, pigments and fillers can be added to them. The use of water-absorbing substances such as, for example, sodium aluminum silicate or of solvents such as, for example, methylethylketone is also possible. Any materials such as, for example, plastics, metal, paper, textiles, rubbers or ceramics can be adhered with the adhesives according to the invention. The process according to the invention is particularly suitable due to the low curing temperature necessary for curing, particularly for the adhesion of materials subjected to deformation or damage at elevated temperatures. This applies, in particular, to plastics.

These adhesives are generally cured by the action of heat in a temperature range of 80° to 200° C., preferably 90° to 140° C. As noted, however, the curing can also be triggered by the action of strong shearing forces, as is the case, for example, with screw fixings, or by use of polar solvents.

The invention is further illustrated, but is not intended to be limited by the following examples in which all parts and percentages are by weight unless otherwise specified.

EXAMPLES (A) Description of the preparation of the one component polyurethane adhesive compositions 1 to 19

Example 1

61.64 parts of dimeric toluylene-2,4-diisocyanate are suspended in a mixture of 268 parts of a polyoxypropylene ether diol having a molecular weight of 1000, 120 parts of a polyoxypropylene ether triol having a molecular weight of 450, 12 parts of ethylene glycol and 0.2 parts of lead-(II)-bis-ethylhexanoate (24% Pb) at ambient temperature, and the suspension is heated to 120° C. with stirring. The dimeric toluylene-2,4-diisocyanate passes into solution and reacts fully with the polyol mixture within a few minutes (IR detection, viscosity increase). After degassing for 2 hours at 90° C., a slightly opaque, prelengthened polyol mixture having a viscosity of 35,000 mPas at 22° C. and 500 mPas at 70° C. and an OH-number of 166,7 is obtained.

2.0 parts of a polyoxypropylene ether triamine having a molecular weight of 438 (Jeffamine T-403 produced by the company Texaco) are now added to the prelengthened higher molecular polyol (461.84 parts) described above and 573.6 parts of dimeric toluylene-2,4-diisocyanate are then suspended therein. To the suspension are added 784 parts of a polyoxypropyleneetherdiamine with an molecular weight of 1000 (preparation see example 21). After degassing for 1 hour at 50° C., a one component adhesive composition which can readily be stored at ambient temperature and has a viscosity of 100 000 mPas at 23° C. is obtained.

At 100°–130° C., it quickly cures to form a tough polyurethane.

A test piece produced from the adhesive composition had a hardness of 70 Shore-D (see Table 1 for the Shore hardness of such test pieces for this and the following Examples).

See Table 2 for the values of the adhesion properties from Examples 1 to 19.

Example 2

An aromatic amino polyether is prepared from an NCO prepolymer on the basis of a polyoxypropylene ether diol having a molecular weight of 2000 and toluylene-2,4-diisocyanate in a molar ratio of 1:2 by the process according to European Patent 71,834 (German Offenlegungsschrift No. 3,131,252) by alkaline hydrolysis.

0.1 parts of 4,4'-diamino-3,3'-dimethyldicyclohexylmethane are mixed into 100 parts of the aromatic amino polyether (amine number 48.4; molecular weight 2314) and 16.6 parts of dimeric 2,4-diisocyanato-toluene are suspended therein. After degassing for 1 hour at 50° C., a suspension is obtained which is stable in storage up to 80° C. and has a viscosity of 24,000 mPas at 22° C. See Tables 1 and 2 for its properties.

Example 3

5.55 parts of 1-isocyanato-3-isocyanato-methyl-3,5,5-trimethyl-cyclohexane are allowed to flow into 98 parts of a polyoxypropylene ether diamine having a molecular weight of 2000 (Jeffamine D-2000 produced by the company Texaco) and 2 parts of a polyoxypropylene ether triamine having a molecular weight of 438 (Jeffamine T-403) with intensive stirring. After degassing for 2 hours at 90° C., a polyoxypropylene ether diamine having a molecular weight of 4222 and a viscosity of 80,000 mPas at 22° C. is obtained.

20 parts of 2,4-/2,6-diamino-3,5-diethyltoluene and 0.3 parts of 4,4'-diamino-3,3'-dimethyl-dicyclohexylmethane are now added to this prelengthened aliphatic polyoxypropylene ether diamine and 53.0 parts of dimeric 2,4-diisocyanato-toluene are suspended in this mixture at ambient temperature. After degassing for 1 hour at 50° C., a suspension which is stable in storage up to 60° C. with a viscosity of 300,000 mPas at 21° C. is obtained. After heating to 100°–130° C., the composition cures to form a high quality adhesive (see Tables 1 and 2).

Example 4

0.25 parts of 4,4'-diamino-3,3'-dimethyldicyclohexylmethane are dissolved in 100 parts of the aromatic amino polyether according to Example 2 (amine number 48.4, molecular weight 2314) and 18.0 parts of 3,3'-diisocyanato-4,4'-dimethyl-diphenylurea (TDIH) are suspended in the mixture. After degassing for 1 hour at 50° C., a suspension which is stable in storage up to 70° C. and has a viscosity of 27,000 mPas at 21° C. is obtained. The composition is applied in a thickness of 1.5 mm between two metal plates. After heating to 100° to 130° C., the composition quickly solidifies to form a high-strength, heat-stable adhesion. See Tables 1 and 2 for further properties.

Example 5

1.0 part of 4,4'-diamino-3,3'-dimethyl-dicyclohexylmethane and 20 parts of 2,4-/2,6-diamino-3,5-diethyltoluene (molar ratio 65:35) are dissolved in 100 parts of the aromatic amino polyether according to Example 2 (amine number 48.4, molecular weight 2314) and 65.0 parts of 3,3'-diisocyanato-4,4'-dimethyl-N,N'-diphenylurea are then suspended in the mixture. After degassing for 1 hour at 50° C., a suspension which is stable in storage up to 50° C. and has a viscosity of 160,000 mPas at 21° C. is obtained. See Tables 1 and 2 for properties.

Example 6

0.2 parts of 4,4'-diamino-3,3'-dimethyldicyclohexylmethane are added to 105.55 parts of the prelengthened polyoxypropylene ether diamine described in Example 3 (molecular weight 4222, viscosity 80,000 mPas at 22° C.) and 10.52 parts of 3,3'-diisocyanato-4,4'-dimethyldiphenylurea are suspended therein at ambient temperature. A suspension which is stable in storage up to 60° C. and has a viscosity of 100,000 mPas at 21° C. is obtained. See Tables 1 and 2 for properties.

Example 7

18 parts of 2,4-/2,6-diamino-3,5-diethyl toluene (molar ratio 65/35), 4 parts of 4,4',4'-triamino-triphenylmethane and 0.7 parts of 4,4'-dimaino-3,3'-dimethyl-dicyclohexylmethane are added to 105.55 parts of a prelengthened polyoxypropylene ether diamine (molecular weight 4222, viscosity 80,000 mPas at 22° C.) prepared according to Example 3, and 56.94 parts of 3,3'-diisocyanato-4,4'-dimethyl-N,N'-diphenylurea are suspended therein at ambient temperature. A suspension which is stable in storage up to 60° C. is obtained which has a viscosity of 400,000 mPas at 21° C. See Tables 1 and 2 for properties.

Example 8

0.1 parts of 4,4'-diamino-3,3'-dimethyldicyclohexylmethane are added to 105.55 parts of the polyoxypropyletherdiamine described in Example 3 (molecular weight 4222, viscosity 80,000 mPas at 22° C.) and 9.63 parts of dimeric 2,4-diisocyanato-toluene are suspended in this mixture at ambient temperature. After degassing for 1 hour at 50° C., a suspension is obtained which is stable in storage up to 60° C. and has a viscosity of 81,000 mPas at 21° C. See Tables 1 and 2 for properties.

Example 9

0.15 parts of ethylene diamine are dissolved in 100 parts of a polyester diol composed of adipic acid and butane diol-1,4 (molecular weight 2250) and 27.8 parts of dimeric 2,4-diisocyanato-toluene are suspended therein at 50° C. 5.0 g of 2,4-/2,6-diamino-3,5-diethyl-toluene and 0.1 parts of a dibutyl tin (IV)-bis-alkoxycarbonyl-mercaptide (catalyst UL-29) are then added. After degassing for 1 hour at 60° C., an adhesive mixture which is stable in storage up to 80° C. and which sets below 50° C. to a readily remeltable, wax-like composition is obtained. At 100 to 130° C., it quickly solidifies to a high quality adhesive compound. See Tables 1 and 2 for properties.

Example 10

An aromatic amino polyester having a molecular weight of 3250 is prepared by the process according to European Patent No. 71,834 by alkaline hydrolysis from an NCO-prepolymer produced from adipic acid-ethylene glycol/butane diol-1,4-(1:1) polyester having a molecular weight of 2000 and toluylene-2,4-diisocyanate in a molar ratio of 1:2.

0.25 parts of 4,4'-diamino-3,3'-dimethyldicyclohexylmethane and 0.1 parts of ethylene diamine are dissolved in 100 parts of the aromatic polyester diamine and 16.0 parts of finely-powdered 3,3'-diisocyanato-4,4'-dimethyl-N,N'-diphenylurea are suspended in this mixture. After degassing for 1 hour at 50° C., a suspension which is stable in storage to 60° C. and highly viscous at ambient temperature is obtained. See Tables 1 and 2 for properties.

Examples 11–13

A solution of 0.1 parts of β-semicarbazidopropionic acid hydrazide in 3 parts of ethylene glycol are added to 105.55 parts of a polyoxypropylene ether diamine prepared according to Example 3 (molecular weight 4222, viscosity 80,000 mPas at 22° C.) and 25.54 parts of dimeric 2,4-diisocyanato-toluene are suspended in this mixture. After degassing for 1 hour at 50° C., a suspension of the adhesive composition which is stable in storage at up to 60° C. and has a viscosity of about 50,000 mPas at 21° C. is obtained. Various quantities of catalysts are added to a mixture prepared in this manner:

Example 11: no catalyst
Example 12: 0.1 parts of tin-II-octoate
Example 13: 0.1 parts of tin-II-octoate +0.1 parts of Pb-octoate.

Examples 14–16

A solution of 0.2 parts of β-semicarbazidopropionic acid hydrazide in 5.23 parts of ethylene glycol are added respectively to 105.55 parts of the mixture of the polyoxypropylene ether diamine described for Examples 11 to 13 and 25.54 parts of dimeric 2,4-diisocyanato-toluene are suspended in this mixture. After degassing for 1 hour at 50° C., an adhesive suspension which is stable in storage at up to 60° C. and has a viscosity of about 30,000 mPas at 21° C. is obtained.

The following catalysts are added in Examples 14 to 16:

Example 14: no catalyst
Example 15: 0.1 parts of Sn-II-octoate
Example 16: 0.1 parts of Sn-II-octoate +0.1 parts of Pb-octoate.

Example 17

124.3 parts of dimeric 2,4-diisocyanato-toluene are suspended in a mixture of 100 parts of a polyoxypropylene ether diol having a molecular weight of 1000, 25 parts of 2,4-/2,6-diamino-3,5-diethyl-toluene, 1.0 part of 2,5-diamino-2,5-dimethyl hexane and 0.2 parts of Pb-2-ethyl-hexoate (Pb-octoate). After degassing for 1 hour at 53° C., an adhesive suspension which is stable in storage at up to 60° C. and has a viscosity of 4000 mPas at 22° C. is obtained. See Tables 1 and 2 for properties.

Comparison Experiments to Example 17

(Comparison) Example 18 (without amine)

19.9 parts of dimeric 2,4-diisocyanato-toluene are suspended in a mixture of 100 parts of a polyoxypropylene ether diol having a molecular weight of 1000, 0.3 parts of 2,5-diamino-2,5-dimethyl hexane and 0.2 parts of Pb-octoate. After degassing for 1 hour at 50° C., a suspension which is stable in storage at up to 60° C. is obtained. At 100°to 130° C., it quickly solidifies to a polyurethane having a Shore-A hardness of 60. As the results in Table 2 show, the adhesion properties of this material are quite unsatisfactory.

(Comparison) Example 19 (without amines and without stabilization of a dimeric diisocyanate)

19.1 parts of dimeric 2,4-diisocyanato-toluene are suspended in 100 parts of a polyoxypropylene ether diol having a molecular weight of 1000. The suspension is chemically stable for about 6 weeks at ambient temperature, even without stabilization, but cures only slowly and unsatisfactorily even at temperatures up to 200° C. The adhesion properties are quite unsatisfactory (see Table 2).

Example 20

20 parts of 2,4-/2,6-diamino-3,5-diethyltoluene (molar ratio 65/35), 0.5 parts of 4,4'-diamino-3,3'-dimethyl-dicyclohexylmethane and 1.0 parts of 1,5-diazabicyclo[4,3,0]-non-5-ene are added to 105.55 parts of the polyoxypropylene ether diamine described in Example 3 (molecular weight 4222, viscosity 80,000 mPas at 22° C.). 52.98 parts of dimeric 2,4-diisocyanatotoluene are suspended in this mixture at ambient temperature. After degassing for 1 hour at 50° C., a suspension which is stable in storage up to 60° C. and has a viscosity of 300,000 mPas at 21° C. is obtained. See Tables 1 and 2 for properties. Hardness: 62 Shore-D.

(B) Testing and Adhesion properties:

Tests for determining the shear strength of adhesives:
A pair of strips of a polyester resin reinforced with 30% glass fibers and measuring 20 mm×40 mm (SMC) or a pair of iron sheets measuring 20 mm×4 mm×2 mm, which had been lightly ground with abrasive paper having a granulation of 280 before application of the adhesive, were used as test material.

The strips were preheated to 120° C. After application of the adhesive in a thickness of 0.2 mm, onto one strip, two strips are brought together so as to form an overlapping area of 10×20 mm. These test pieces are stored at 120° C. for the period specified below. The shear strength, which allows handling for further processing at 1N/mm² without separation of the adhesive, was tested manually immediately afterwards. After storage of the test pieces for 1 hour at ambient temperature, the shear strength is determined according to DIN 53 283 with a spindle feed of 100 mm per minute.

The results are shown in Table 2 for adhesion on glass fiber-reinforced polyester resins and on iron. The shear strengths were first tested by hand immediately after 15 minutes at 120° C., i.e. still in the hot state (see first column) and after storage of the adhesion after 1 hour at ambient temperature (see other columns).

In addition to the glass fiber-reinforced polyester and iron, the rubber material SBR-2 (material based on styrene-butadiene-rubber, Shore-A 90) was used as further test material according to DIN 16 909. The adhesive composition according to Example 9 was selected as the adhesive. The adhesive set in 15 minutes at 120° C. The value determined in a separating test at a spindle feed of 100 mm/min. according to DIN 53 273 was 5.8N/mm (after 24 hours storage at ambient temperature).

TABLE 1

Shore hardnesses of test pieces produced from the adhesive mixtures by heating at 120° C.

| Example No. | Shore-A | Shore-D |
|---|---|---|
| 1 | 95 | — |
| 2 | 94 | — |
| 3 | — | 65 |
| 4 | 95 | — |
| 5 | — | 67 |
| 6 | 77 | — |
| 7 | — | 65 |
| 8 | 60 | — |
| 9 | 88 | |
| 10 | 90 | |
| 11 | 79 | |
| 12 | 81 | |
| 13 | 81 | |
| 14 | 80 | |
| 15 | 82 | |
| 16 | 76 | |
| 17 | — | 58 |
| 18 (Comparison) | 60 | — |
| 19 (Comparison) | (liquid) | — |
| 20 | — | 62 |

TABLE 2

| Adhesive mixture according to Example | Shear strength [N/mm²] (after 15 min./120° C.) immediately (tested hot by hand) | | Shear strength [N/mm²] (after 15 min./120° C.) and after storage (1 hr. at ambient temp.) | |
|---|---|---|---|---|
| | SMC | Iron | SMC | Iron |
| 1 | >1 | >1 | 9.7 | 13.8 |
| 2 | >1 | >1 | 2.5 | 5.5 |
| 3 | >1 | >1 | 6.7 | 9.6 |
| 4 | >1 | >1 | 4.4 | 9.3 |
| 5 | >1 | >1 | 11.2 | 16.5 |
| 6 | >1 | >1 | 2.6 | 5.1 |
| 7 | >1 | >1 | 9.1 | 16.5 |
| 8 | >1 | >1 | 3.4 | 2.3 |
| 9 | >1 | >1 | 5.3 | 9.2 |
| 10 | >1 | >1 | 10.8 | 9.2 |
| 11 | >1 | >1 | 7.3 | 7.5 |
| 12 | >1 | >1 | 6.2 | 8.1 |
| 13 | >1 | >1 | 6.2 | 6.8 |
| 14 | >1 | >1 | 5.6 | 6.5 |
| 15 | >1 | >1 | 6.1 | 10.2 |
| 16 | >1 | >1 | 7.9 | 10.9 |
| 17 | >1 | >1 | 7.6 | 13.5 |
| Comparison | | | | |
| 18 | 0 | 0 | 1.8 | 1.6 |
| 19 | 0 | 0 | 0 | 0 |
| 20 | >1 | >1 | 4.2 | 9.0 |

SMC = Sheet Molding Compound (glass fiber-reinforced polyester resin plate)

Example 21

Preparation of the pelyoxypropylene ether diamine, molecular weight 1000, as used in example 1).

A polyether diol of a molecular weight of about 1000 was prepared by addition or propylene oxide to the starter diol bis-(4 hydroxyphenyl)-propane and refluxing the mixture. This polyetherdiol is transferred into the polyetheramine by amination with a 20-fold excess of ammonia at 225° C./150–160 bar, using raney-nickel-iron as catalyst. After filtration the polyetheramine is isolated; molecular weight 1000.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the adhesive joining of two surfaces wherein an adhesive is first applied to at least one of the surfaces and the surfaces are then brought into contact with each other, the improvement wherein the adhesive is a thermosetting reactive adhesive
  (i) which is flowable or readily meltable at ambient or slightly elevated temperature,
  (ii) which is stable in storage at ambient temperature,
  (iii) which sets quickly at temperatures of 80° C. or more,
  (iv) which comprises:
    (A) a surface-modified, finely-divided polyisocyanate wherein from 0.1 to 25 equivalent percent of the isocyanate groups of the unmodified polyisocyanate have been deactivated, and
    (B) a member selected from the group consisting of
      (a) aliphatic and/or aromatic polyamines having molecular weights of from 400 to 6000,
      (b) aromatic polyamines having molecular weights of from 108 to 399, and
      (c) mixtures thereof, and
  (v) which can be activated by application of heat, polar solvents and/or high shearing forces.

2. The process of claim 1, wherein said surface-modified, finely-divided polyisocyanate is prepared by reacting a solid, finely-divided polyisocyanate having a melting point of 40° C. or more with from 0.1 to 25 equivalent percent of an aliphatic polyamine.

3. The process of claim 2, wherein said solid, finely-divided polyisocyanate has a melting point of 80° C. or more.

4. The process of claim 2, wherein said solid, finely-divided polyisocyanate is reacted with from 0.1 to 8 equivalent percent of said aliphatic polyamine.

5. The process of claim 1, wherein said surface-modified, finely-divided polyisocyanate is prepared by reacting a solid, finely-divided polyisocyanate having a melting point of 40° C. or more with from 0.1 to 25 equivalent percent of a compound selected from the group consisting of hydrazine, alkyl hydrazine or compounds containing terminal —CO—NH—NH$_2$ groups.

6. The process of claim 5, wherein said solid, finely-divided polyisocyanate has a melting point of 80° C. or more.

7. The process of claim 5, wherein said, solid, finely-divided polyisocyanate is reacted with from 0.1 to 8 equivalent percent of said compound.

8. The process of claim 1, wherein said surface-modified, finely-divided polyisocyanate is prepared by reacting a solid, finely-divided polyisocyanate having a melting point of 40° C. or more with from 0.1 to 25 equivalent percent of a compound containing amidine and/or guanidine groups and containing no hydrogen atoms reactive with isocyanate groups at ambient temperature.

9. The process of claim 8, wherein said solid, finely-divided polyisocyanate has a melting point of 80° C. or more.

10. The process of claim 8, wherein said solid, finely-divided polyisocyanate is reacted with from 0.1 to 8 equivalent percent of said compound.

11. The process of claim 1, wherein said component (B) is an aliphatic and/or aromatic polyamine having a molecular weight of from 400 to 6000.

12. The process of claim 1, wherein said component (B) is a mixture of (a) and (b).

13. The process of claim 1, wherein said component (B) is an aromatic polyamine having a molecular weight of from 108 to 399, and wherein said adhesive also includes (C) a polyhydroxyl compound having a molecular weight of from 400 to 6000.

14. The process of claim 1, wherein said surface-modified, finely-divided polyisocyanate is prepared by reacting a solid, finely-divided polyisocyanate with component (B) in an amount such that the resultant composition is directly used as said adhesive.

15. The process of claim 1, wherein said adhesive also contains a hydroxyl-functional compound selected from the group consisting of (i) polyhydroxyl compounds having molecular weights of from 400 to 6000, (ii) aliphatic and/or cycloaliphatic polyols having molecular weights of from 62 to 399, and (iii) mixtures thereof.

16. The process of claim 15, wherein the NCO to (NH$_2$+OH) equivalent ratio is from 0.5:1 to 1.5:1.

17. The process of claim 16 wherein said equivalent ratio is from 0.95:1 to 1.2:1.

18. The process of claim 15, wherein the amount of any components having molecular weights of 399 or less relative to the amount of any components having molecular weights of from 400 to 6000 is such that from 0.1 to 10 equivalents of the lower molecular weight compounds are present per equivalent of higher molecular weight compounds.

19. The process of claim 18. wherein from 0.3 to 8 equivalents of the lower molecular weight compounds are present per equivalent of higher molecular weight compounds.

20. The process of claim 1, wherein said adhesive is thermoset at a temperature of from 80° to 200° C.

* * * * *